US012810751B2

(12) United States Patent
Bae

(10) Patent No.: US 12,810,751 B2
(45) Date of Patent: Nov. 24, 2026

(54) PREFABRICATED NOSE MODEL FOR EXPLAINING RHINOPLASTY PROCEDURE

(71) Applicant: BISTOOL INC., Seoul (KR)

(72) Inventor: Eun Hyun Bae, Seoul (KR)

(73) Assignee: BISTOOL INC., Seoul (KR)

( * ) Notice: Subject to any disclaimer, the term of this patent is extended or adjusted under 35 U.S.C. 154(b) by 334 days.

(21) Appl. No.: 18/600,112

(22) Filed: Mar. 8, 2024

(65) Prior Publication Data

US 2024/0355231 A1 Oct. 24, 2024

(30) Foreign Application Priority Data

Apr. 18, 2023 (KR) ........................ 10-2023-0050453

(51) Int. Cl.
*G09B 23/32* (2006.01)
*G09B 23/34* (2006.01)

(52) U.S. Cl.
CPC ............. *G09B 23/32* (2013.01); *G09B 23/34* (2013.01)

(58) Field of Classification Search
CPC ........ G09B 23/32; G09B 23/34; G09B 23/28; G09B 23/30; G09B 19/10
See application file for complete search history.

(56) References Cited

U.S. PATENT DOCUMENTS 10,181,270 B1 * 1/2019 Fuller .................... G09B 23/30

* cited by examiner

*Primary Examiner* — Jay Trent Liddle
*Assistant Examiner* — Jose Angeles
(74) *Attorney, Agent, or Firm* — Dinsmore & Shohl LLP

(57) ABSTRACT

Proposed is a prefabricated nose model for explaining a rhinoplasty procedure. The prefabricated nose model is used to show a change in the appearance of the nose according to the rhinoplasty procedure. The prefabricated nose model includes a main body having a front surface provided with a nasal bone corresponding portion and having a penetration space provided on a lower side of the nasal bone corresponding portion, a fixing body detachably coupled to the penetration space, an upper lateral cartilage corresponding portion which protrudes forward from the main body while being supported on the fixing body and which is positioned at a lower portion of the nasal bone corresponding portion; and a lower lateral cartilage corresponding portion mounted on a lower side of the upper lateral cartilage corresponding portion such that a position of the lower lateral cartilage corresponding portion is capable of being adjusted.

9 Claims, 8 Drawing Sheets

PREFABRICATED NOSE MODEL FOR EXPLAINING RHINOPLASTY PROCEDURE

CROSS REFERENCE TO RELATED APPLICATION

The present application claims priority to Korean Patent Application No. 10-2023-0050453, filed Apr. 18, 2023, the entire contents of which are incorporated herein for all purposes by this reference.

BACKGROUND OF THE INVENTION

Field of the Invention

The present disclosure relates to a nose model that can be used in plastic surgery. More particularly, the present disclosure relates to a prefabricated nose model for explaining a rhinoplasty procedure, the prefabricated nose model being used to inform a patient of a change in the appearance of the nose according to a rhinosurgery when an interview is performed with the patient before the rhinosurgery.

Description of the Related Art

As medical technology has developed and people's desire to have a beautiful face has increased, the number of people who have facial plastic surgery is increasing. Particularly, since the nose positioned at the center of the face has a great influence on impression, cases of plastic surgery on the nose are increasing.

There are a variety of rhinoplasty methods. Furthermore, according to the type of incision, the rhinoplasty methods may be categorized into non-open type methods in which incision is performed on only the inside of the nose and open type methods in which incision is performed on the outside of the nose as well. In the open type surgery, a skin incision line starts from the mucous membrane portion inside the nose, and is connected to the outside of the nasal column, so that an incision portion is exposed to the outside. Therefore, since visibility is secured, there is an advantage that the rhinoplasty procedure is easy to be performed. However, there is a hassle of having to correct the bridge of the nose while covering the incision portion after the surgery.

An internal structure of a nose 101 is briefly illustrated in FIG. 1.

As illustrated in the drawing, the upper lateral cartilage 105, the lower lateral cartilage 107, and the septal cartilage 109 are positioned on a lower portion of a nasal bone 103. The upper lateral cartilage 105, the lower lateral cartilage 107, and the septal cartilage 109 are covered with the skin, and maintain the shape of the nose.

Particularly, when the septal cartilage (separately collected) is fixed between the lower lateral cartilages such that the lower lateral cartilages are raised, the left and right balance of the nose may be fitted, and the nose may have a straight shape, which is the content that the plastic surgeon will explain to the patient during a consultation related to the rhinoplasty procedure.

However, since the description described above is performed only with words or with a picture or a model, it is often difficult for the patient (with no medical knowledge) to understand what the lower lateral cartilage is and how the lower lateral cartilage is moved. That is, the effect of the explanation is reduced. A conventional nose model has a limitation that the conventional nose model only shows a cross-sectional shape of the nose part and that a movement of the lower lateral cartilage cannot be realized. Therefore, a nose model having a structure in which a lower lateral cartilage portion is capable of being actually moved so that the understanding of the patient can be increased is required.

SUMMARY OF THE INVENTION

Accordingly, the present disclosure has been made keeping in mind the above problems occurring in the related art, and an objective of the present disclosure is to provide a prefabricated nose model for explaining a rhinoplasty procedure, the prefabricated nose model being configured such that the assembly and the disassembly of the prefabricated nose model are capable of being performed so that only a part damaged during using the prefabricated nose model is capable of being easily replaced, and the prefabricated nose model being configured such that a portion corresponding to the lower lateral cartilage is capable of being moved, thereby being capable of being used to explain a change in the appearance of the nose according to the rhinoplasty procedure to a patient.

In order to achieve the objectives described above, according to the present disclosure, there is provided a prefabricated nose model for explaining a rhinoplasty procedure, the prefabricated nose model being used for showing a change in an appearance of the nose according to the rhinoplasty procedure, and the prefabricated nose model including: a main body having a front surface provided with a nasal bone corresponding portion, the main body having a penetration space provided at a lower side of the nasal bone corresponding portion; a fixing body coupled to the penetration space such that the fixing body is capable of being attached to and detached from the penetration space; an upper lateral cartilage corresponding portion which protrudes forward from the main body while being in a state in which the upper lateral cartilage corresponding portion is supported on the fixing body and which is positioned at a lower portion of the nasal bone corresponding portion; and a lower lateral cartilage corresponding portion mounted on a lower side of the upper lateral cartilage corresponding portion such that a position of the lower lateral cartilage corresponding portion is capable of being adjusted.

In addition, the fixing body may include: a fixing post mounted on a rear surface of the main body such that the fixing post is capable of being attached to and detached from the main body, the fixing post supplying a supporting force; and a center plate formed integrally with the fixing post, the center plate supporting the upper lateral cartilage corresponding portion and the lower lateral cartilage corresponding portion while being in a state in which the center plate is accommodated inside the penetration space.

In addition, the center plate may be a vertical plate-shaped member which is disposed on a center portion of the penetration space and which divides the penetration space into a left side and a right side, and a holder configured to support the lower lateral cartilage corresponding portion such that the position of the lower lateral cartilage corresponding portion is capable of being adjusted may be provided on a lower side portion of the center plate.

In addition, the holder may have an accommodating space which extends in front and rear directions and which is opened forward and downward through an open slit, and a connecting portion which is caught in the accommodating space of the holder and which receives a supporting force from the holder may be mounted on the lower lateral cartilage corresponding portion.

In addition, the connecting portion may include: a locking ball accommodated inside the accommodating space such that a position of the locking ball is capable of being adjusted; and an extension rod connecting the locking ball and the lower lateral cartilage corresponding portion to each other.

In addition, an entrance passage may be further formed in the holder, the entrance passage allowing the locking ball to pass through an inside of the holder or allowing the locking ball to pass through an outside of the holder.

In addition, a holder cap may be further provided on a lower side portion of the holder, the holder cap being coupled to a lower portion of the holder such that the holder cap is capable of being attached to and detached from the lower portion of the holder, and the holder cap being configured to block an entrance passage.

In addition, the holder cap may have a holder support portion, the holder support portion being coupled to the fixing post such that the holder support portion is capable of being attached to and detached from the fixing post, and the holder support portion partially covering the open slit of the holder.

In addition, a plurality of fixing grooves may be formed on an upper side of the center plate, and respective insertion protrusions fitted and coupled to the fixing grooves may be provided on the upper lateral cartilage corresponding portion.

In addition, the fixing post may be a bar-shaped member and may vertically cross a penetration hole, and a fitting groove that accommodates an upper end portion and a lower end portion of the fixing post such that the upper end portion and the lower end portion of the fixing post are capable of being attached to and detached from the fitting groove is formed in the rear surface of the main body.

The prefabricated nose model for explaining the rhinoplasty procedure of the present disclosure as described above is capable of being disassembled and assembled, so that only a part damaged during using the prefabricated nose model is capable of being easily replaced.

In addition, since the portion corresponding to the lower lateral cartilage is capable of being moved, the patient may more easily be informed of a change in the appearance of the nose according to the rhinoplasty procedure.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, an embodiment according to the present disclosure will be described in more detail with reference to the accompanying drawings.

Basically, a nose model of the present disclosure is a structure formed in a shape of a person's nose, and may be used, for example, in a plastic surgery hospital. For example, the nose model of the present disclosure may be used to inform a patient of a change in the appearance of the nose according to a rhinosurgery when an interview is performed with the patient before the rhinosurgery.

Such a nose model is used to show a change in the appearance of the nose according to a rhinoplasty procedure. The nose model includes: a main body having a front surface provided with a nasal bone corresponding portion and having a penetration space provided on a lower side of the nasal bone corresponding portion; a fixing body detachably coupled to the penetration space; an upper lateral cartilage corresponding portion which protrudes forward from the main body while the upper lateral cartilage corresponding portion is supported on the fixing body and which is positioned on a lower portion of the nasal bone corresponding portion; and a lower lateral cartilage corresponding portion mounted on a lower side of the upper lateral cartilage corresponding portion such that a position of the lower lateral cartilage corresponding portion is capable of being adjusted.

Figure 2:
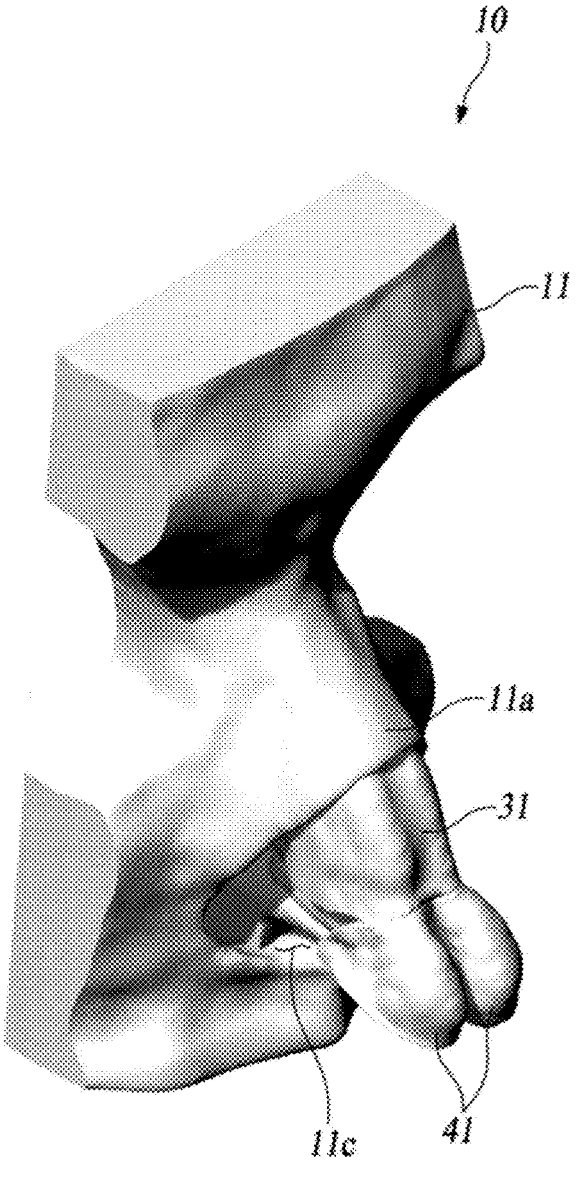
FIG. 2 is a perspective view illustrating a prefabricated nose model for explaining a rhinoplasty procedure according to an embodiment of the present disclosure.
Figure 3:
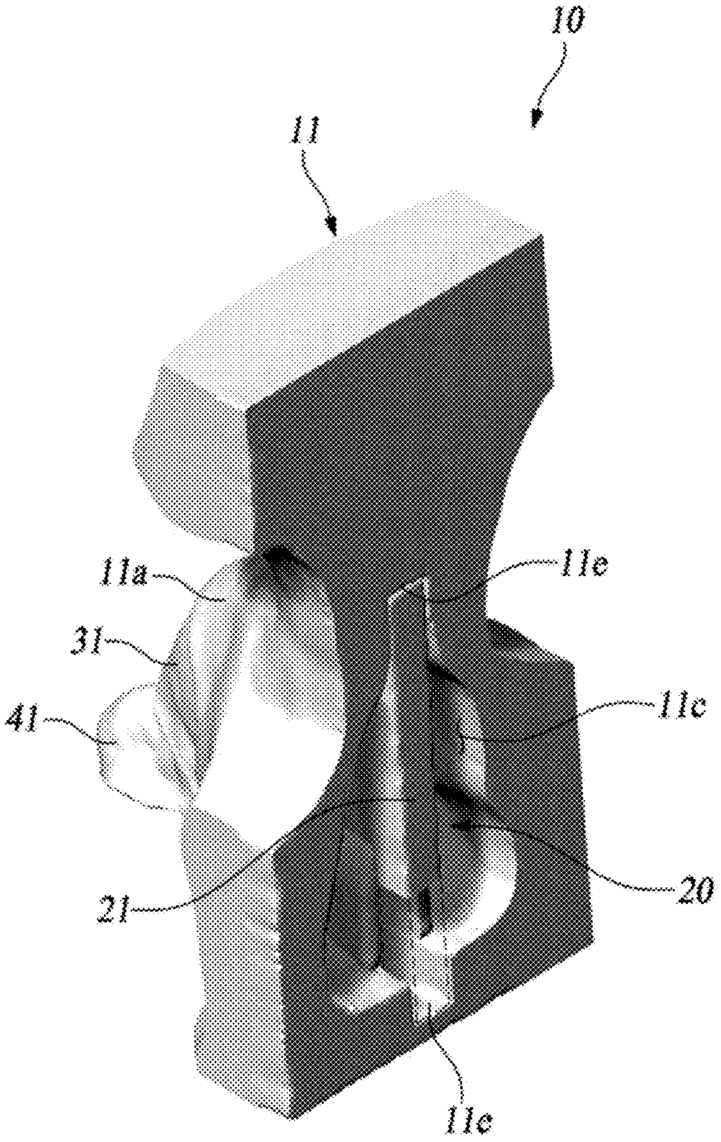
FIG. 3 is a view illustrating a back appearance of the nose model illustrated in FIG. 2.
Figure 4:
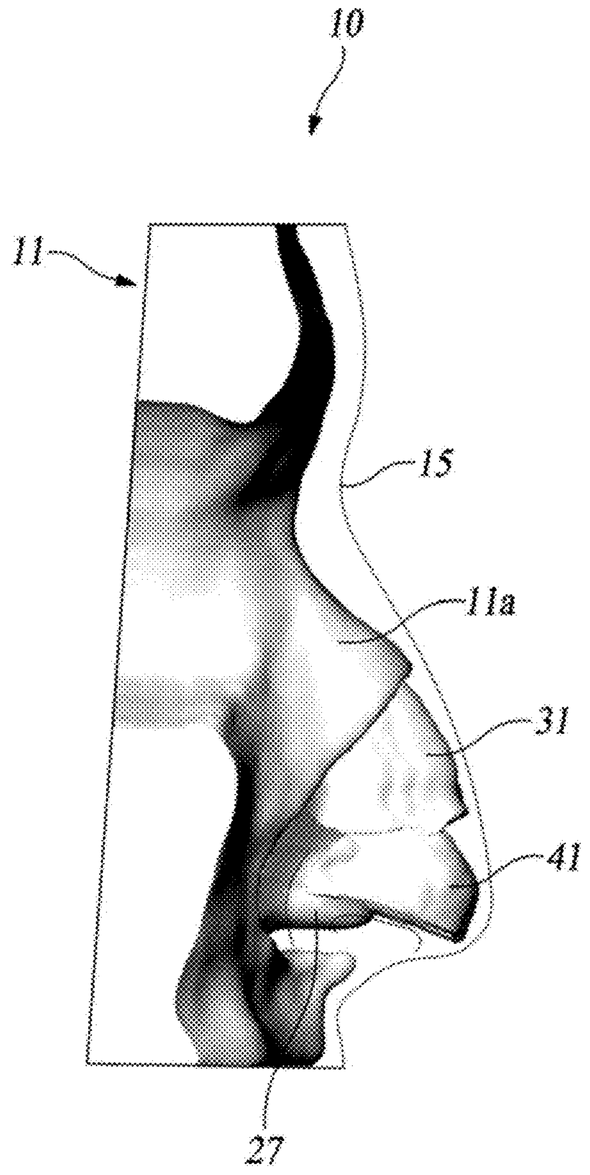
FIG. 4 is a side view of the nose model in FIG. 2.
Figure 5:
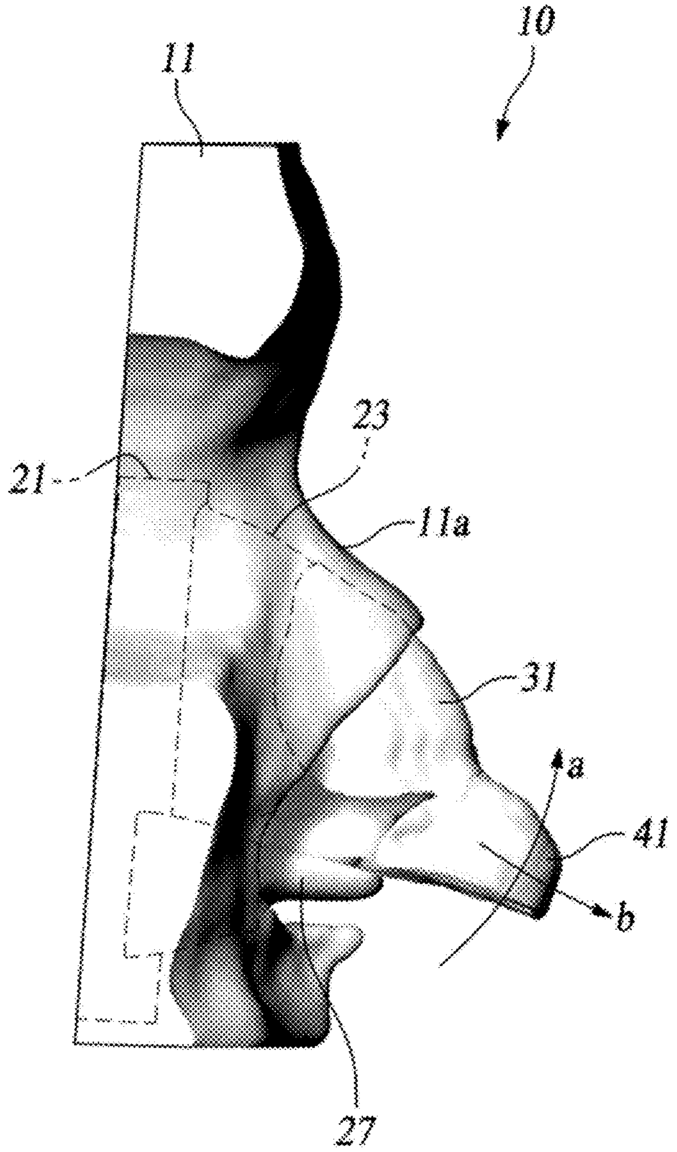
FIG. 5 is a view illustrating movement characteristics of a lower lateral cartilage corresponding portion in the nose model illustrated in FIG. 2.
Figure 6:
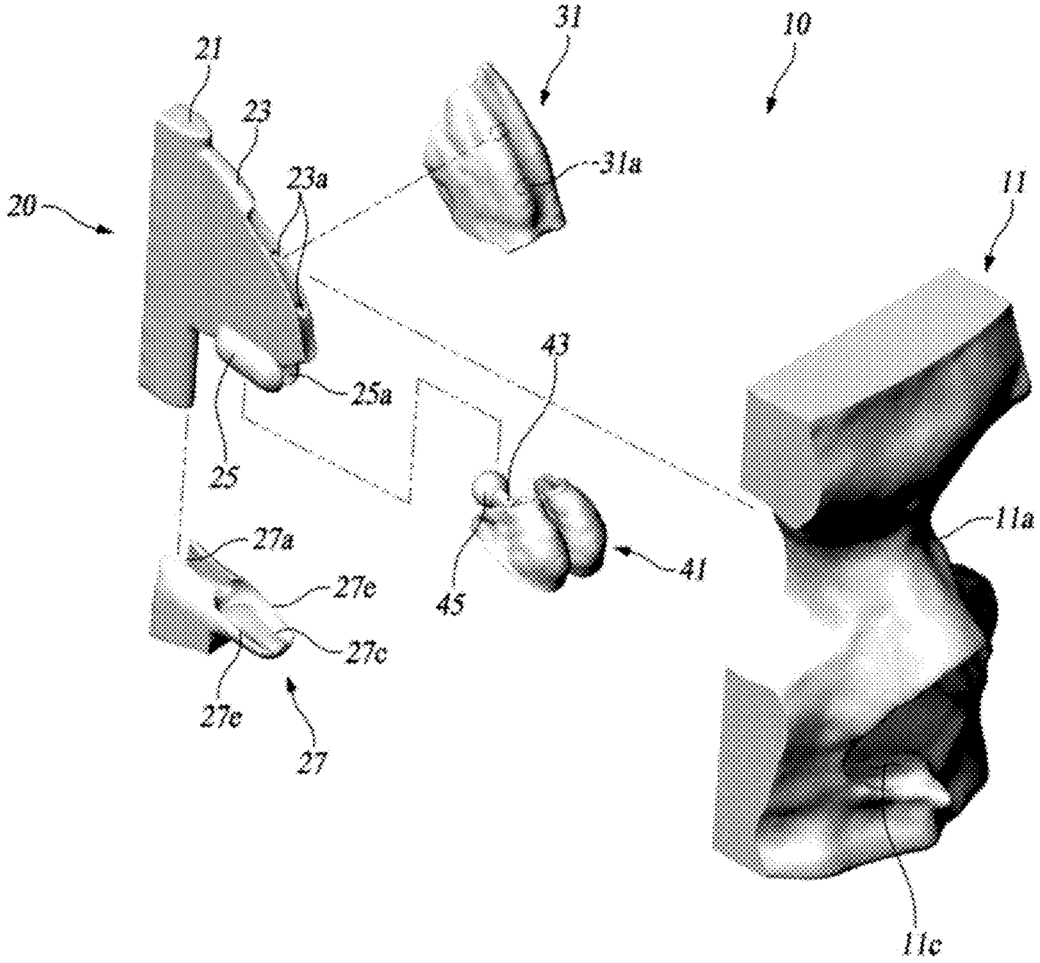
FIG. 6 is an exploded perspective view illustrating the nose model in FIG. 2.
Figure 7:
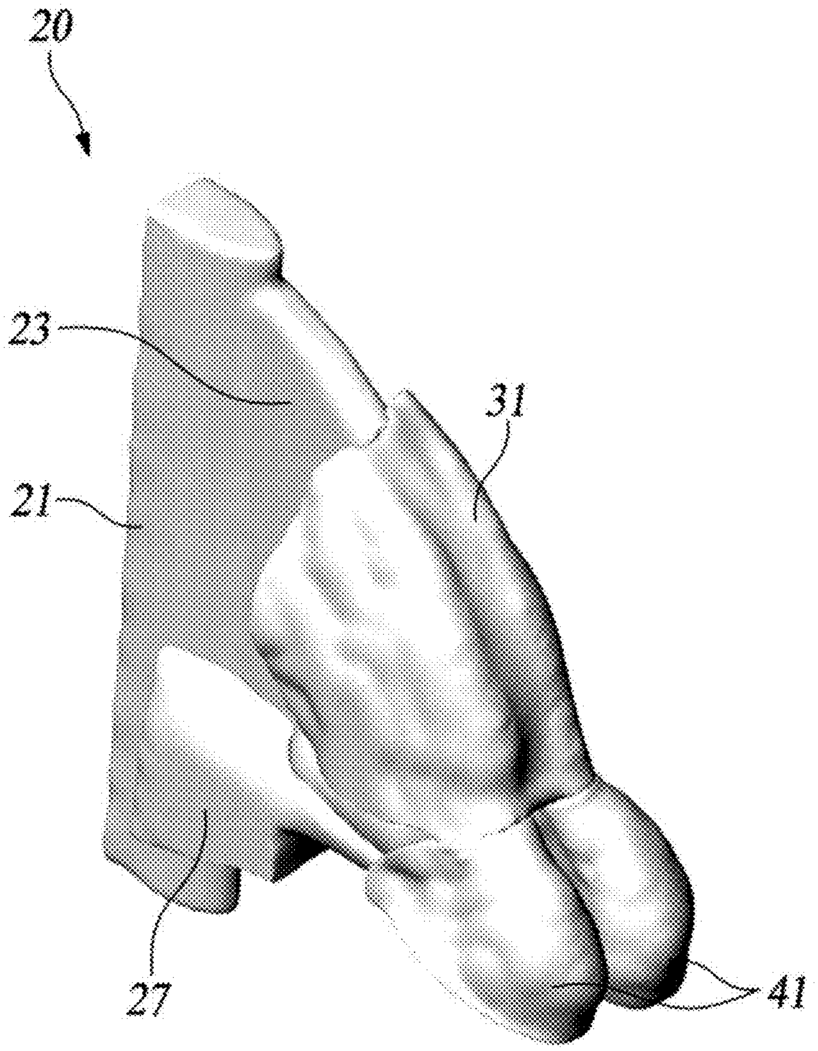
FIG. 7 is a view illustrating a state in which an upper lateral cartilage corresponding portion and the lower lateral cartilage corresponding portion are mounted on a fixing body.
Figure 8:
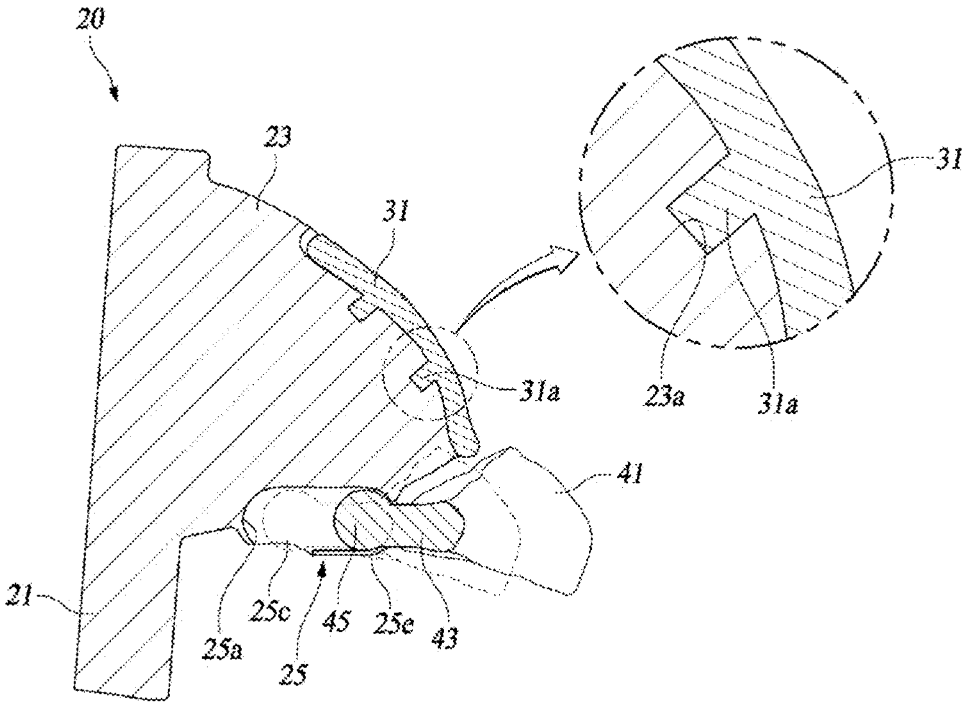
FIG. 8 is a view illustrating a mounting state of the upper lateral cartilage corresponding portion and the lower lateral cartilage corresponding portion to the fixing body.

FIG. 2 is a perspective view illustrating a prefabricated nose model 10 for explaining a rhinoplasty procedure according to an embodiment of the present disclosure, FIG. 3 is a view illustrating a back appearance of the nose model illustrated in FIG. 2, and FIG. 4 is a side view of the nose model illustrated in FIG. 2. In addition, FIG. 5 is a view illustrating movement characteristics of a lower lateral cartilage corresponding portion in the nose model, and FIG. 6 is an overall exploded perspective view of the nose model illustrated in FIG. 2. In addition, FIG. 7 is a view illustrating a state in which an upper lateral cartilage corresponding portion and the lower lateral cartilage corresponding portion are mounted on a fixing body, and FIG. 8 is a view illustrating a mounting state of the upper lateral cartilage corresponding portion and the lower lateral cartilage corresponding portion to the fixing body.

As illustrated in the drawings, the prefabricated nose model 10 according to the present embodiment includes a main body 11, a fixing body 20, an upper lateral cartilage corresponding portion 31, and a lower lateral cartilage corresponding portion 41, and a holder cap 27.

The main body 11 is a member replicating a portion of the facial bone where the nose is located, and has a front surface provided with a nasal bone corresponding portion 11*a*. The nasal bone corresponding portion 11*a* is a portion corresponding to the nasal bone, and is downwardly inclined toward a front direction.

In addition, a penetration space 11*c* is provided on a lower side of the nasal bone corresponding portion 11*a*. The penetration space 11*c* is a passage through which the nasal cartilage is exposed to the outside from the actual facial bone. In the present embodiment, the fixing body 20 is mounted in the penetration space 11*c*.

In addition, as illustrated in FIG. 3, a fitting groove 11*e* is formed on a rear surface of the main body 11. The fitting groove 11*e* is a groove that accommodates an upper end portion and a lower end portion of a fixing post 21 such that the upper end portion and the lower end portion of the fixing post 21 are capable of being attached to and detached from the fitting groove 11*e*, and the fixing post 21 will be described later. When the upper and lower end portions of the fixing post 21 are pressed and inserted into the fitting groove 11*e*, the fixing body 20 is coupled to the main body 11. Of course, a user is capable of detaching the fixing post 21 from the fitting groove 11*e* by applying a force. The main body 11 may be manufactured by injection molding or by using a 3D printing method.

The fixing body 20 is a supporting member for supporting the upper lateral cartilage corresponding portion 31 and the lower lateral cartilage corresponding portion 41, and is capable of being attached to and detached from the main body 11 as described above. In order to replace or maintain the upper lateral cartilage corresponding portion 31 or the lower lateral cartilage corresponding portion 41, the fixing body 20 is capable of being separated from the main body 11.

The fixing body 20 is provided with the fixing post 21 and a center plate 23. The fixing post 21 is a bar-shaped member that extends vertically, and the upper and lower end portions of the fixing post 21 are fitted into and fixed to the fitting groove 11*e*, thereby supporting a supporting force. The fixing post 21 mounted in the fitting groove 11*e* crosses a center of the penetration space 11*c* in a vertical direction, and divides the penetration space 11*c* into a left side and a right side.

The center plate 23 is a plate-shaped member having a predetermined thickness, and is formed as an in upper member having a constant thickness, and is integrated with a first side of the fixing post 21. The center plate 23 is disposed on a center portion of the penetration space 11*c*, and divides the penetration space 11*c* into the left side and the right side. The reason that the center plate 23 is positioned at the center portion of the penetration space 11*c* is to align the upper lateral cartilage corresponding portion 31 and the lower lateral cartilage corresponding portion 41 with a downward extension line of the nasal bone corresponding portion 11*a*.

As described above, the center plate 23 is in a state in which the center plate 23 is accommodated inside the penetration space 11*c*, and the center plate 23 supports the upper lateral cartilage corresponding portion 31 and the lower lateral cartilage corresponding portion 41.

In order to fix the upper lateral cartilage corresponding portion 31 to the center plate 23, a plurality of fixing grooves 23*a* is formed in an upper thickness surface of the center plate 23, and an insertion protrusion 31*a* is provided on an inner surface of the upper lateral cartilage corresponding portion 31. By inserting the insertion protrusion 31*a* into the fixing groove 23*a*, the upper lateral cartilage corresponding portion 31 is coupled to the center plate 23. Of course, the upper lateral cartilage corresponding portion 31 is capable of being separated from the center plate 23.

As long as the upper lateral cartilage corresponding portion 31 is capable of being detachably fixed to the center plate 23, a fixing method of the upper lateral cartilage corresponding portion 31 to the center plate 23 is capable of being changed.

Figure 1:
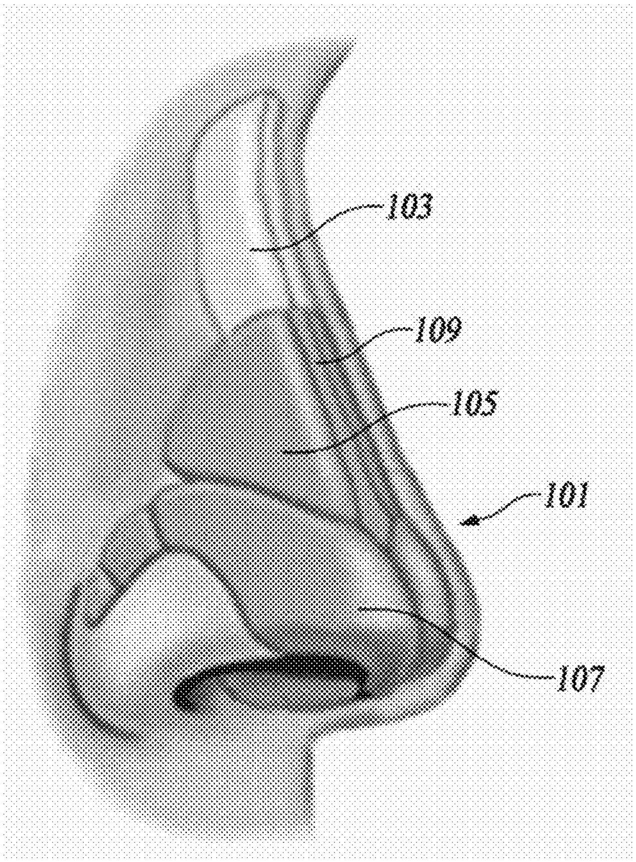
FIG. 1 is a view illustrating an anatomical structure inside the nose.

The upper lateral cartilage corresponding portion 31 is a member that replaces an upper lateral cartilage 105 that forms the nose (reference numeral 101 in FIG. 1). As illustrated in FIG. 5, the upper lateral cartilage corresponding portion 31 protrudes forward from the main body 11 and is positioned at the lower portion of the nasal bone corresponding portion 11*a*. The upper lateral cartilage corresponding portion 31 may also be manufactured by using a 3D printer. The upper lateral cartilage corresponding portion 31 is somewhat soft and may be elastically deformed.

A holder 25 that supports the lower lateral cartilage corresponding portion 41 such that the position of the lower lateral cartilage corresponding portion 41 is capable of being adjusted is formed integrally with the lower side portion of the center plate 23.

The holder 25 is formed integrally with the lower portion of the center plate 23, and provides an accommodating space 25*a* as illustrated in FIG. 8. The accommodating space 25*a* is a space that extends in front and rear directions, and partially accommodates a connecting portion. The holder 25 has a shape of a hollow capsule.

In addition, the accommodating space 25*a* is opened forward and downward through an open slit 25*e*. The open slit 25*e* has a width through which an extension rod 43 can pass therethrough. In addition, an entrance passage 25*c* is further formed in a lower side of the holder 25. The entrance passage 25*c* is a hole where a locking ball 45 to be described later can enter and exit. That is, the entrance passage 25*c* is a passage for inserting the locking ball 45 into the holding space 25*a*, or for removing the locking ball 45 inside the holding space 25*a* to the outside of the holder 25. As such, since the entrance passage 25*c* and the open slit 25*e* are formed in the holder 25, the position adjustment of the lower lateral cartilage corresponding portion 41 with respect to the holder 25 and the replacement of the lower lateral cartilage corresponding portion 41 are capable of being performed.

Meanwhile, as illustrated in FIG. 4 and FIG. 5, the lower lateral cartilage corresponding portion 41 is mounted on the lower side of the upper lateral cartilage corresponding portion 31 such that the position of the lower lateral cartilage corresponding portion 41 is capable of being adjusted. The lower lateral cartilage corresponding portion 41 is a portion that replaces a lower lateral cartilage (reference numeral 107 in FIG. 1) that is positioned at the end of the nose 101.

The upper lateral cartilage corresponding portion 31 and the lower lateral cartilage corresponding portion 41 are exposed to a front side of the penetration space 11*c* while being in a state in which the upper lateral cartilage corresponding portion 31 and the lower lateral cartilage corresponding portion 41 are assembled on the center plate 23. In a state in which the upper lateral cartilage corresponding portion 31 and the lower lateral cartilage corresponding portion 41 are exposed to the front side, when the upper lateral cartilage corresponding portion 31 and the lower lateral cartilage corresponding portion 41 are covered with a skin corresponding member 15, the shape of the nose may be realized. The skin corresponding member 15 is formed of forming a flexible silicone, and covers the entire surface of the nose model. The skin corresponding member 15 is bonded to the main body 11, the upper lateral cartilage corresponding portion 31, and the lower lateral cartilage corresponding portion 41, and may be removed as required.

Particularly, as illustrated in FIG. 5, the position of the lower lateral cartilage corresponding portion 41 may be adjusted along a direction of the arrow a and along an opposite direction of the arrow a, and may be adjusted along a direction of the arrow b and along an opposite direction of the arrow b. That is, the lower lateral cartilage corresponding portion 41 may be moved upward or downward along the direction of the arrow a, and may be pulled or pushed along the direction of the arrow b.

In order to move the lower lateral cartilage corresponding portion 41 in the manner described above, the connecting portion is provided integrally with the lower lateral cartilage corresponding portion 41. The connecting portion is a portion partially caught in the accommodating space 25*a* of the holder 25 and a supporting force from the holder 25 is supplied to the portion, and the connecting portion is provided with the locking ball 45 and the extension rod 43.

The locking ball 45 has a shape of a sphere, and is accommodated inside the accommodating space 25*a* such that a position of the locking ball 45 is capable of being adjusted. A diameter of the locking ball 45 is equal to an inner diameter of the accommodating space 25*a*. Therefore, the locking ball 45 cannot be moved freely within the accommodating space 25*a* due to a friction action, and is moved only when the user applies a force to the locking ball 45. The locking ball 45 is capable of passing through the entrance passage 25*c*.

The extension rod 43 is a straight member that connects the locking ball 45 and the lower lateral cartilage corresponding portion 41 to each other. The extension rod 43 is capable of moving along the open slit 25*e* while passing through the open slit 25*e*. By applying the extension rod 43, the lower lateral cartilage corresponding portion 41 is capable of being moved along the direction of the arrow b illustrated in FIG. 5 or along the opposite direction.

Since the shape of the nose is modified by adjusting the position of the lower lateral cartilage 107 during the actual rhinoplasty procedure, the lower lateral cartilage corresponding portion 41 is configured such that the lower lateral cartilage corresponding portion 41 is capable of being moved even in the nose model 10. Therefore, for example, a doctor may move the lower lateral cartilage corresponding portion 41 while holding the nose model 10 in the hand, and may more easily explain to the patient, "since a patient's nose is currently in this shape, the patient's nose will become beautiful when the lower lateral cartilage corresponding portion 41 is moved this way".

The holder cap 27 is a member which is detachably coupled to a lower side portion of the holder 25 and which blocks the entrance passage 25*c* and a portion of the open slit 25*e*. The holder cap 27 is separated from the holder 25 when the lower lateral cartilage corresponding portion 41 is replaced.

The holder cap 27 is provided with a coupling groove 27*a*. The coupling groove 27*a* is a portion coupled to the fixing post 21 at the lower portion of the center plate 23. The fixing post 21 is inserted into the coupling groove 27*a* in a forcibly fitting manner, and then is maintained in a coupling state.

In addition, the holder cap 27 further includes a holder support portion 27*c* and a side wall portion 27*e*. The holder support portion 27*c* is a portion that covers the entrance passage 25*c* and a portion of the open slit 25*e*. Since the holder support portion 27*c* covers the entrance passage 25*c* and the open slit 25*e*, there is no risk of the extension rod 43 and locking ball 45 falling downward.

In addition, the side wall portion 27*e* is a portion that is in close contact with an outer circumferential surface of the holder 25, is configured to prevent shaking of the holder cap 27, thereby preventing a coupling force of the fixing post 21 to the coupling groove 27*a* from decreasing.

Finally, as described above, since disassembly and assembly of each part of the prefabricated nose model 10 of the present embodiment is capable of being performed, a damaged part or a decrepit part may be individually replaced and maintained. In addition, since the lower lateral cartilage corresponding portion 41 is capable of being moved, information about the rhinoplasty procedure can be explained to the patient in three dimensions, so that the patient can understand the explanation and make a decision about the rhinoplasty procedure.

The specific embodiment of the present disclosure is described in detail above. However, the present disclosure is not limited to the specific embodiment. It would be apparent to a person of ordinary skill in the art that various modifications to the present disclosure are possible within the scope of the technical idea of the present disclosure.

What is claimed is:

1. A prefabricated nose model for explaining a rhinoplasty procedure, the prefabricated nose model being used for showing a change in an appearance of a nose according to the rhinoplasty procedure, and the prefabricated nose model comprising:

a main body having a front surface provided with a nasal bone corresponding portion, the main body having a penetration space provided at a lower side of the nasal bone corresponding portion;

a fixing body coupled to the penetration space such that the fixing body is capable of being attached to and detached from the penetration space;

an upper lateral cartilage corresponding portion which protrudes forward from the main body while being in a state in which the upper lateral cartilage corresponding portion is supported on the fixing body and which is positioned at a lower portion of the nasal bone corresponding portion; and a lower lateral cartilage corresponding portion mounted on a lower side of the upper lateral cartilage corresponding portion such that a position of the lower lateral cartilage corresponding portion is capable of being adjusted, wherein the fixing body comprises:

a fixing post mounted on a rear surface of the main body such that the fixing post is capable of being attached to and detached from the main body, the fixing post supplying a supporting force; and a center plate formed integrally with the fixing post, the center plate supporting the upper lateral cartilage corresponding portion and the lower lateral cartilage corresponding portion while being in a state in which the center plate is accommodated inside the penetration space, wherein the center plate is a vertical plate-shaped member which is disposed on a center portion of the penetration space and which divides the penetration space into a left side and a right side, and a holder configured to support the lower lateral cartilage corresponding portion such that the position of the lower lateral cartilage corresponding portion is capable of being adjusted is provided on a lower side portion of the center plate, and wherein the holder has an accommodating space which extends in front and rear directions and which is opened forward and downward through an open slit, and a connecting portion which is caught in the accommodating space of the holder and which receives a supporting force from the holder is mounted on the lower lateral cartilage corresponding portion.

2. The prefabricated nose model of claim 1, wherein the connecting portion comprises:

a locking ball accommodated inside the accommodating space such that a position of the locking ball is capable of being adjusted; and an extension rod connecting the locking ball and the lower lateral cartilage corresponding portion to each other.

3. The prefabricated nose model of claim 2, wherein an entrance passage is further formed in the holder, the entrance passage allowing the locking ball to pass through an inside of the holder or allowing the locking ball to pass through an outside of the holder.

4. The prefabricated nose model of claim 2, wherein a holder cap is further provided on a lower side portion of the holder, the holder cap being coupled to a lower portion of the holder such that the holder cap is capable of being attached to and detached from the lower portion of the holder, and the holder cap being configured to block an entrance passage.

5. The prefabricated nose model of claim 4, wherein the holder cap has a holder support portion, the holder support portion being coupled to the fixing post such that the holder support portion is capable of being attached to and detached from the fixing post, and the holder support portion partially covering the open slit of the holder.

6. The prefabricated nose model of claim 1, wherein the fixing post is a bar-shaped member and vertically crosses a penetration hole, and a fitting groove that accommodates an upper end portion and a lower end portion of the fixing post such that the upper end portion and the lower end portion of the fixing post is capable of being attached to and detached from the fitting groove is formed in the rear surface of the main body.

7. A prefabricated nose model for explaining a rhinoplasty procedure, the prefabricated nose model being used for showing a change in an appearance of a nose according to the rhinoplasty procedure, and the prefabricated nose model comprising:

a main body having a front surface provided with a nasal bone corresponding portion, the main body having a penetration space provided at a lower side of the nasal bone corresponding portion;

a fixing body coupled to the penetration space such that the fixing body is capable of being attached to and detached from the penetration space;

an upper lateral cartilage corresponding portion which protrudes forward from the main body while being in a state in which the upper lateral cartilage corresponding portion is supported on the fixing body and which is positioned at a lower portion of the nasal bone corresponding portion; and a lower lateral cartilage corresponding portion mounted on a lower side of the upper lateral cartilage corresponding portion such that a position of the lower lateral cartilage corresponding portion is capable of being adjusted, wherein the fixing body comprises:

a fixing post mounted on a rear surface of the main body such that the fixing post is capable of being attached to and detached from the main body, the fixing post supplying a supporting force; and a center plate formed integrally with the fixing post, the center plate supporting the upper lateral cartilage corresponding portion and the lower lateral cartilage corresponding portion while being in a state in which the center plate is accommodated inside the penetration space, wherein the center plate is a vertical plate-shaped member which is disposed on a center portion of the penetration space and which divides the penetration space into a left side and a right side, and a holder configured to support the lower lateral cartilage corresponding portion such that the position of the lower lateral cartilage corresponding portion is capable of being adjusted is provided on a lower side portion of the center plate, and wherein a plurality of fixing grooves is formed on an upper side of the center plate, and respective insertion protrusions fitted and coupled to the plurality of fixing grooves are provided on the upper lateral cartilage corresponding portion.

8. A prefabricated nose model for explaining a rhinoplasty procedure, the prefabricated nose model being used for showing a change in an appearance of a nose according to the rhinoplasty procedure, and the prefabricated nose model comprising:

a main body having a front surface provided with a nasal bone corresponding portion, the main body having a penetration space provided at a lower side of the nasal bone corresponding portion;

a fixing body coupled to the penetration space such that the fixing body is capable of being attached to and detached from the penetration space;

an upper lateral cartilage corresponding portion which protrudes forward from the main body while being in a state in which the upper lateral cartilage corresponding portion is supported on the fixing body and which is positioned at a lower portion of the nasal bone corresponding portion; and a lower lateral cartilage corresponding portion mounted on a lower side of the upper lateral cartilage corresponding portion such that a position of the lower lateral cartilage corresponding portion is capable of being adjusted, wherein the fixing body comprises:

a fixing post mounted on a rear surface of the main body such that the fixing post is capable of being attached to and detached from the main body, the fixing post supplying a supporting force; and a center plate formed integrally with the fixing post, the center plate supporting the upper lateral cartilage corresponding portion and the lower lateral cartilage corresponding portion while being in a state in which the center plate is accommodated inside the penetration space, wherein a holder configured to support the lower lateral cartilage corresponding portion such that the position of the lower lateral cartilage corresponding portion is capable of being adjusted is provided on a lower side portion of the center plate, and wherein the lower lateral cartilage corresponding portion is configured to be at least pulled in a forward direction and pushed in an opposite direction to the forward direction with respect to the holder in a state where the prefabricated nose model is assembled.

9. The prefabricated nose model of claim 8, wherein the lower lateral cartilage corresponding portion is configured to be moved upward and downward with respect to the holder in the state where the prefabricated nose model is assembled.

* * * * *